United States Patent
Feng et al.

(10) Patent No.: US 10,318,178 B1
(45) Date of Patent: Jun. 11, 2019

(54) ACCELERATING COPY OF ZERO-FILLED DATA EXTENTS

(71) Applicant: EMC IP Holding Company LLC, Hopkinton, MA (US)

(72) Inventors: Changyu Feng, Beijing (CN); Henry Austin Spang, IV, Hopkinton, MA (US); Jian Gao, Beijing (CN); Xinlei Xu, Beijing (CN); Xiongcheng Li, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 123 days.

(21) Appl. No.: 15/581,954

(22) Filed: Apr. 28, 2017

(51) Int. Cl.
*G06F 3/06* (2006.01)
*G06F 13/16* (2006.01)
*G06F 13/40* (2006.01)

(52) U.S. Cl.
CPC ............ *G06F 3/0613* (2013.01); *G06F 3/065* (2013.01); *G06F 3/0656* (2013.01); *G06F 3/0659* (2013.01); *G06F 3/0665* (2013.01); *G06F 3/0683* (2013.01); *G06F 13/1673* (2013.01); *G06F 13/4072* (2013.01)

(58) Field of Classification Search
CPC ...... G06F 3/0613; G06F 3/065; G06F 3/0656; G06F 3/0659; G06F 3/0665; G06F 3/0683; G06F 13/1673; G06F 13/4072
USPC ..................................... 710/52, 68; 711/162
See application file for complete search history.

(56) References Cited

U.S. PATENT DOCUMENTS

| | | | | |
|---|---|---|---|---|
| 5,673,209 | A * | 9/1997 | Heiney | G06T 9/00 341/51 |
| 7,934,029 | B2 * | 4/2011 | Chaussade | H03M 7/46 341/51 |
| 9,916,244 | B1 | 3/2018 | Tolvanen et al. | |
| 10,025,510 | B1 * | 7/2018 | Koli | G06F 3/0619 |
| 2010/0186014 | A1 * | 7/2010 | Vaghani | G06F 3/06 718/101 |

OTHER PUBLICATIONS

Lili Chen, et al.; "Zero on Demand Operations Based on Zeroed Chunk Tables of Storage Drive Objects Stored in Main Memory," U.S. Appl. No. 14/750,441, filed Jun. 25, 2015.

(Continued)

*Primary Examiner* — Gary J Portka
(74) *Attorney, Agent, or Firm* — BainwoodHuang (57) ABSTRACT

A method of accelerating copy operations is performed by a data storage appliance. The method includes (a) in response to receiving a copy command to copy from a source extent to a target extent, issuing a buffered read command to read from the source extent down a storage stack of the data storage appliance by a driver running on the data storage appliance, the source extent being part of a first logical disk backed by non-volatile storage of the data storage appliance and the target extent being part of a second logical disk backed by non-volatile storage of the data storage appliance, (b) in response to issuing, receiving at the driver an indication from the storage stack that the source extent is empty, and (c) in response to receiving, issuing a zero-fill command to fill the target extent with zeroes down the storage stack by the driver.

17 Claims, 5 Drawing Sheets

(56) References Cited

OTHER PUBLICATIONS

Milind M. Koli, et al.: "Pairing of Data Storage Requests," U.S. Appl. No. 15/199,166, filed Jun. 30, 2016.
Milind M. Koli, et al.: "Techniques for Performing Data Storage Copy Operations in an Integrated Manner," U.S. Appl. No. 15/199,192, filed Jun. 30, 2016.
Milind M. Koli, et al.: "Techniques for Migrating to a Thinly-Provisioned Logical Disk Without Vriting Zero Blocks," U.S. Appl. No. 15/389,124, filed Dec. 22, 2016.
Jian Gao, et al.: "Per-Drive Memory Resident Zeroing Maps for Drive Zeroing in a Data Storage System," U.S. Appl. No. 15/392,342, filed Dec. 28, 2016.

\* cited by examiner

ACCELERATING COPY OF ZERO-FILLED DATA EXTENTS

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices In order to reduce host and network overhead, certain operations may be offloaded to the data storage system. For example, Windows-based XCOPY Lite and VMware vSphere® Storage APIs—Array Integration (VAAI) XCOPY allow a host to instruct the data storage system to transfer data from one location on the data storage system to another location on the data storage system without transferring the data to the host over the network.

SUMMARY

Unfortunately, conventional data storage systems that implement XCOPY may suffer from inefficiencies when a source location is completely filled with zeroes. Even though the data is highly repetitive, buffers filled with zeroes may be transferred around the data storage system, wasting bandwidth.

Thus, it would be desirable to detect when an XCOPY or other offloaded copy command has a source that is entirely empty of data (all zeroes) and to then utilize a zero-fill operation to easily fill the destination with zeroes without transferring empty buffers across the data storage system.

In one embodiment, a method of accelerating copy operations is performed by a data storage system. The method includes (a) in response to receiving a copy command to copy from a source extent to a target extent, issuing a buffered read command to read from the source extent down a storage stack of the data storage appliance by a driver running on the data storage appliance, the source extent being part of a first logical disk backed by non-volatile storage of the data storage appliance and the target extent being part of a second logical disk backed by non-volatile storage of the data storage appliance, (b) in response to issuing the buffered read command, receiving at the driver an indication from the storage stack that the source extent is empty, and (c) in response to receiving the indication that the source extent is empty, issuing a zero-fill command to fill the target extent with zeroes down the storage stack by the driver. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments are directed to techniques for detecting when an XCOPY or other offloaded copy command has a source that is entirely empty of data (all zeroes) and to then utilize a zero-fill operation to easily fill the destination with zeroes without transferring empty buffers around the data storage system.

Figure 1:
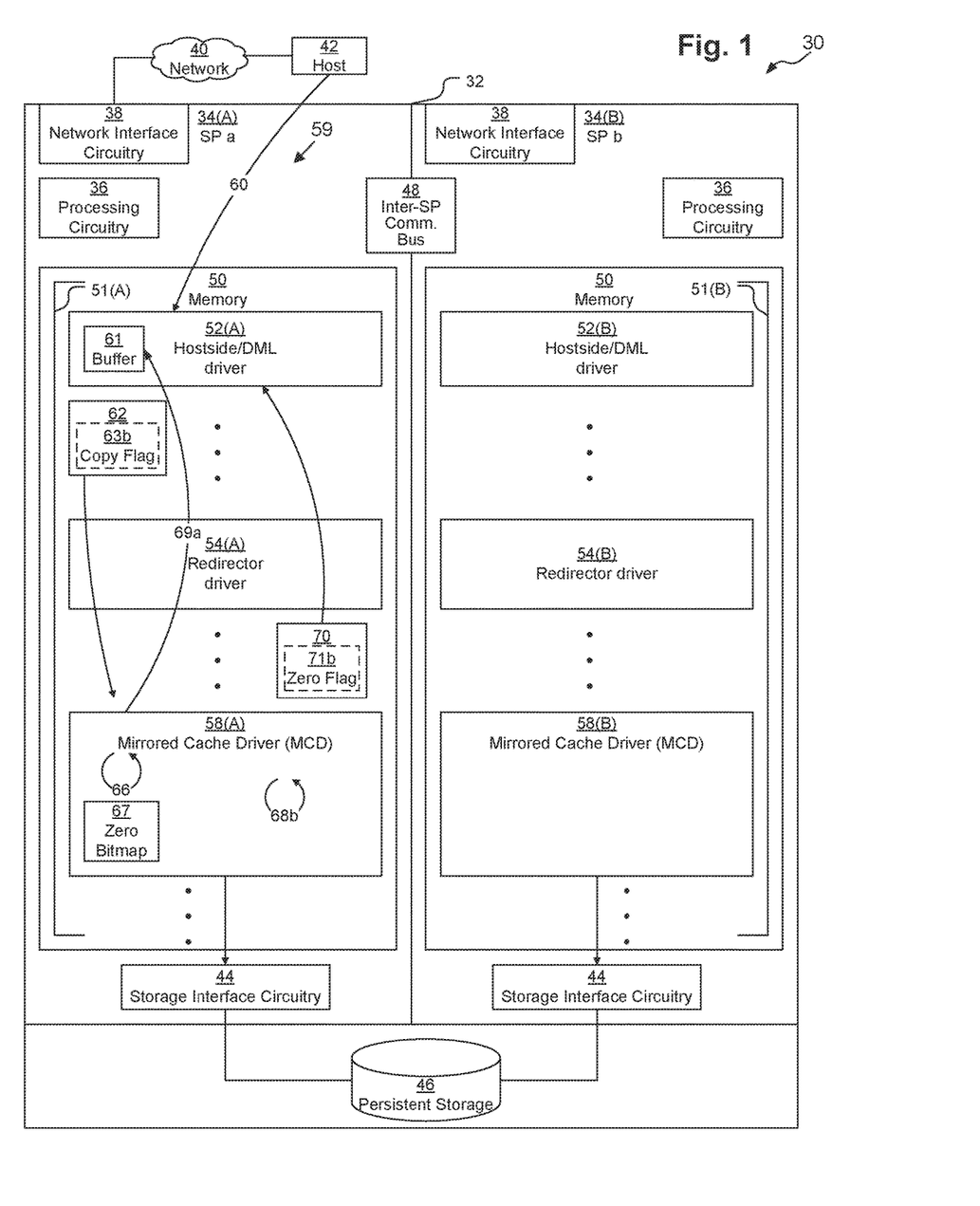
FIG. 1 is a block diagram depicting an example system and apparatus for use in connection with various embodiments as well as example methods of various embodiments.

FIG. 1 shows an example environment 30 in which embodiments of the improved techniques hereof can be practiced. Here, one or more host computing devices ("hosts") 42 access a data storage system (DSS) 32 over a network 40. The DSS 32 includes a set of two or more storage processors (SPs) 34(A), 34(B) connected to persistent storage 46 of the DSS 32. Each SP 34 includes processing circuitry 36, network interface circuitry 38, memory 50, storage interface circuitry 44, an inter-SP communications bus 48, and interconnection circuitry (not depicted).

DSS 30 may be any kind of computing device, such as, for example, a personal computer, workstation, server computer, enterprise server, DSS rack server, laptop computer, tablet computer, smart phone, mobile computer, etc. Typically, computing device 30 is a DSS rack server, such as, for example, a VMAX® series enterprise data storage system or a VNX® series data storage system provided by Dell EMC of Hopkinton, Mass. DSS 30 is typically housed in one or more storage cabinets (not depicted). However, in some embodiments, DSS 30 may be a distributed system operating across a network.

Persistent storage 46 may include one or more of any kind of storage device (not depicted) able to persistently store data, such as, for example, a magnetic hard disk drive, a solid state storage device (SSD), etc. Storage interface circuitry 44 controls and provides access to persistent storage 46. Storage interface circuitry 44 may include, for example, SCSI, SAS, ATA, SATA, Fibre Channel (FC), and/or other similar controllers and ports as well as a RAID controller, etc.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

The network 40 may be any type of network or combination of networks, such as a storage area network (SAN), a local area network (LAN), a wide area network (WAN), the Internet, and/or some other type of network or combination of networks, for example. The host 42 may connect to the DSS 32 using various technologies, such as Fibre Channel, iSCSI, NFS, SMB 3.0, and CIFS, for example. Any number of hosts 42 may be provided, using any of the above protocols, some subset thereof, or other protocols besides those shown.

Network interface circuitry 38 may include one or more Ethernet cards, cellular modems, Fibre Channel (FC) adapters, Wireless Fidelity (Wi-Fi) wireless networking adapters, and other devices for connecting to a network 40, such as a SAN, local area network (LAN), wide area network (WAN), cellular data network, etc. Network interface circuitry 38 is able to communicate with host 42 over network 40.

A host 42 may be any kind of computing device configured to operate on a network, such as, for example, personal computers, workstations, server computers, enterprise servers, laptop computers, tablet computers, smart phones, mobile computers, etc. or combinations thereof. Typically, a host 42 is a server computer or an enterprise server.

In an example, the SPs 34(A), 34(B) of the DSS 32 are configured to receive I/O requests and to respond to such I/O requests by reading or writing to the persistent storage 46. Typically each SP 34 is configured to serve as an owner of several particular logical disks (referred to as "LUNs") which are accessible by hosts 42. Any given LUN is only owned by one SP 34, but a host 42 is also able to access that LUN through the other SP 34 through redirection. Typically, upon failure of one SP 34, the other SP 34 can take over as the owner of the failed SP's LUNs. Thus, if SP 34(A) owns a first LUN, then if host 42 attempts to access that first LUN through SP 34(B), SP 34(B) will redirect I/Os through SP 34(A) as is well-known in the art.

Each SP 34(a), 34(b) may be provided as a circuit board assembly, or "blade," which plugs into a chassis (not depicted) of DSS 32, which encloses and cools the SPs 34. The chassis has a backplane (not depicted) for interconnecting the SPs 34, and additional connections may be made among SPs 34 using cables (not depicted). It is understood, however, that no particular hardware configuration is required, as any number of SPs 34, including a single SP 34, may be provided and the SP 34 can be any type of computing device capable of processing host I/Os.

Inter-SP communications bus 48 is a high-speed interconnect that may be mounted on the backplane. Mirrored cache data and redirected operation commands may be transferred over the Inter-SP communications bus 48.

Memory 50 may be any kind of digital system memory, such as, for example, random access memory (RAM). Memory 50 stores one or more operating systems (OSes) (not depicted) in operation (e.g., Linux, UNIX, Windows, MacOS, or a similar operating system), various applications executing on processing circuitry 36, and application data. Memory 50 stores a storage stack 51 (depicted as storage stack 51(A) on SP 34(A) and storage stack 51(B) on SP 34(B)) that includes various drivers, including hostside driver 52, redirector driver 54, mirrored cache driver MCD 58, and other low-level storage drivers (not depicted) for interfacing with storage interface circuitry 44. There may also be other intermediate drivers within storage stack 51. The drivers in the storage stack 51 together realize various logical storage structures, such as, for example, LUNs (not depicted) that are accessible by host 42.

In some embodiments, memory 50 may also include a persistent storage portion (not depicted). Persistent storage portion of memory 50 may be made up of one or more persistent storage devices, such as, for example, disks. Persistent storage portion of memory 50 or persistent storage 46 is configured to store programs and data even while the DSS 32 is powered off. The OS, applications, and drivers 52, 54, 58 are typically stored in this persistent storage portion of memory 50 or on persistent storage 46 so that they may be loaded into a system portion of memory 50 from this persistent storage portion of memory 50 or persistent storage 46 upon a system restart. These applications and drivers 52, 54, 58, when stored in non-transient form, either in the volatile portion of memory 50, on persistent storage 46, or in persistent portion of memory 50, form a computer program product. The processing circuitry 36 running one or more of these applications or drivers 52, 54, 58 thus forms a specialized circuit constructed and arranged to carry out the various processes described herein.

During operation, DSS 30 processes input/output operations (I/Os) (also referred to as storage operations) from hosts 42 aimed at the LUNs. Hostside driver 52 is a layer at the top of storage stack 51. Hostside driver 52 receives I/Os from hosts 42 via network interface circuitry 38 and network 40. Hostside driver 52 also implements a library, such as the Data Movement Library (DML), that defines various types of I/Os and how to implement those I/Os by sending inter-driver commands down the storage stack 51. Therefore hostside driver 51 may also be referred to as Hostside/DML driver 51. In some embodiments, inter-driver commands may take the form of I/O Request Packets (IRPs) holding an IOCTL or DeviceIoControl system call as is well-known in the art.

Redirector driver 54(A) is a driver that is responsible for redirecting I/Os that are aimed at LUNs owned by the other SP 34(B) and for receiving and processing redirected I/Os redirected from the other SP 34(B) aimed at LUNs owned by the SP 34(A).

MCDs 58 are drivers that transparently provide access to backing store within the persistent storage 46 in such a manner that higher-layer drivers (e.g. drivers 52, 54) in storage stack 51 are often not aware whether any given block of a LUN is currently backed by a cache page within a mirrored cache (not depicted) in a dirty manner or whether the persistent storage 46 currently accurately represents that block. Typically, while being accessed by the storage stack 51, any given block is at least temporarily cached as a page within mirrored cache.

Mirrored cache may be made up of any form of memory, but, in some embodiments, it is made up of high-speed memory. In other embodiments, it is wholly or partly made up of battery-backed memory or non-volatile memory for fault tolerance purposes.

MCD 58(A) communicates with a peer MCD 58(B) that operates similarly to MCD 58(A) but on the other SP 34(B). This communication takes place over high-speed inter-SP communications bus 48. This high-speed inter-SP communications bus 48 allows the entire contents of mirrored cache to be mirrored on the peer mirrored cache with low latency. In this manner, even though the mirrored cache contains dirty pages that are not yet flushed to persistent storage 46, there is protection against failure of the SP 34(A) because a backup copy exists within peer mirrored cache on SP 34(B).

In operation, FIG. 1 depicts an arrangement 59. Arrangement 59 is a method of processing an XCOPY or other offloaded copy operation (hereinafter XCOPY) 60 from a host 42 and of deciding whether or not source data of the XCOPY 60 is all zeroes, in which case operation would proceed with a zero-fill operation versus a buffered write operation (see below in connection with FIGS. 3-5).

Figure 2:
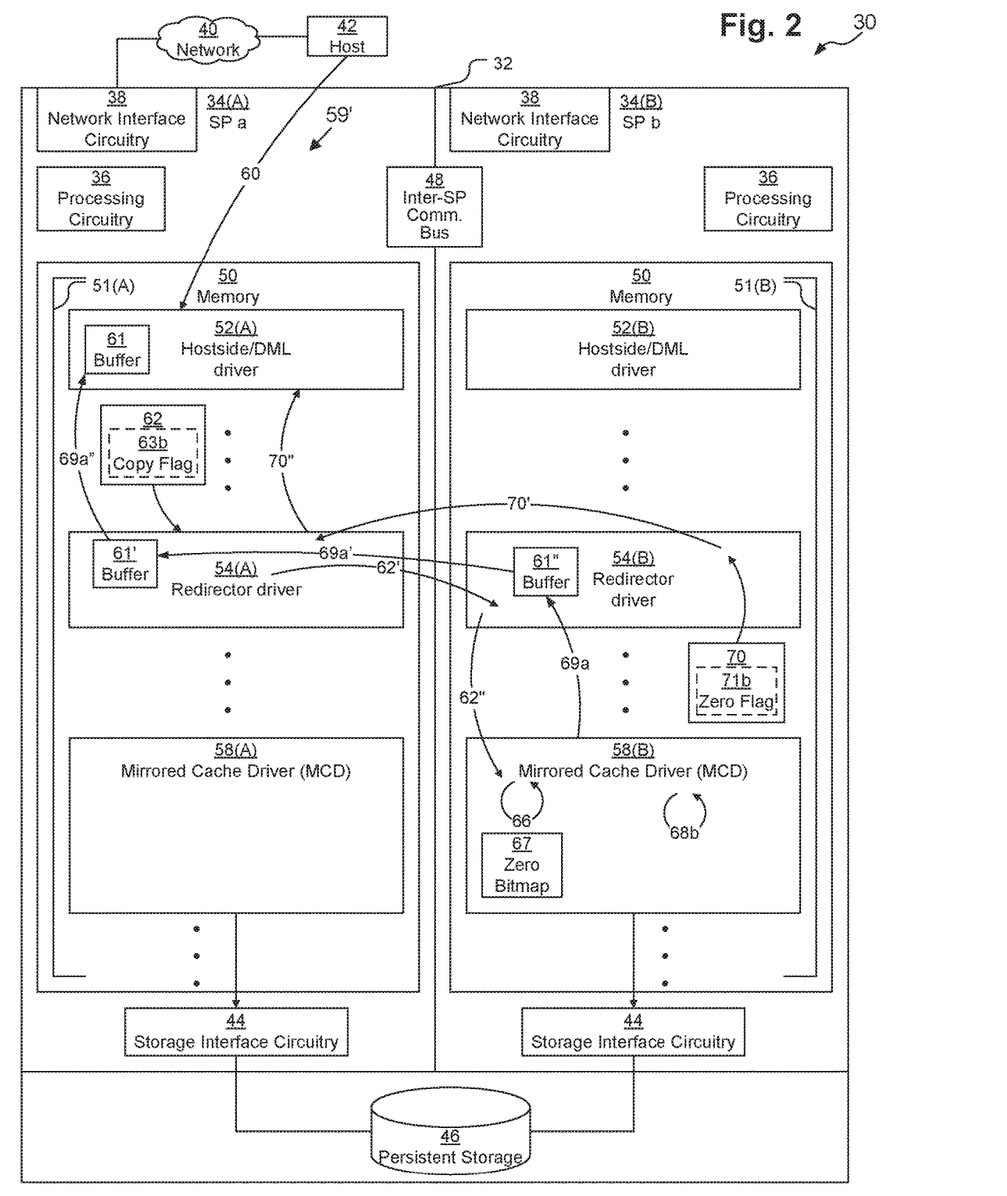
FIG. 2 is a block diagram depicting an example system and apparatus for use in connection with various embodiments as well as example methods of various embodiments.

Hostside driver 52(A) receives XCOPY 60 which has a source descriptor (not depicted) and a target descriptor (not depicted). The source descriptor identifies a particular LUN (source LUN) and one or more address ranges on that LUN from which data is to be copied. The target descriptor identifies a particular LUN (target LUN) and one or more address ranges on that LUN to which data is to be copied. Arrangement 59 in FIG. 1 is drawn to a particular situation in which the source LUN is owned by the same SP 34(A) that received the XCOPY 60. Alternate arrangement 59' depicted in FIG. 2 is drawn to an alternative situation in which the source LUN is owned by the peer SP 34(B) that did not receive the XCOPY 60.

In order to fulfill XCOPY 60, hostside driver 52(A) prepares and sends a buffered read command 62 (e.g., as an inter-driver command taking the form of an IRP) down the storage stack 51(A). Hostside driver 52(A) also prepares a buffer 61 to which the data from the source address range (or source extent) may be stored. Hostside driver 52(A) sets a copy flag 63b within buffered read command 62 to indicate that the buffered read command 62 is part of an XCOPY 60.

Since, in the arrangement 59 of FIG. 1, SP 34(A) owns the source LUN, redirector driver 54(A) does not intercept or alter the buffered read command 62 as it proceeds down storage stack 51(A). Upon buffered read command 62 reaching MCD 58(A), MCD 58(A) processes buffered read command 62 by performing a zero check operation 66 to determine, with reference to a zero bitmap 67, if the source extent is empty (i.e., filled entirely with zeroes). In some embodiments, as an optimization, regions of LUNs that are filled entirely with zeroes may be unmapped to any backing store on persistent storage 46. Instead, zero bitmap 67 indicates which regions are entirely full of zeroes (and hence unmapped to backing store). In one embodiment, bitmap 67 has a granularity of one megabyte, each region being one megabyte in size and aligned to logical block addresses within the LUN that are integer multiples of a megabyte.

MCD 58(A) also performs a copy check operation 68b to determine whether the copy flag 63b is set within buffered read command 62. This copy check operation 68b is omitted in prior art systems. If copy check operation 68b determines that the copy flag 63b is not set within buffered read command 62, then buffered read command 62 is treated as a simple buffered read command, and MCD 58(A) fills (in buffer fill process 69a) buffer 61 with data of the source extent (which is known to be entirely zeroes due to zero check operation 66).

However, if copy check operation 68b determines that the copy flag 63b is set within buffered read command 62, then buffered read command 62 is treated as part of an XCOPY. Since it is known that the source extent is filled entirely with zeroes due to zero check operation 66, MCD 58(A) prepares a read response IRP 70 and sets a zero flag 71b therein, omitting buffer fill process 69a.

Regardless of the outcome of copy check operation 68b, MCD 58(A) sends the read response IRP 70 back up the storage stack 51(A) towards hostside driver 52(A). However, only if the copy check operation 68b yields a positive result will read response IRP 70 include the zero flag 71b.

Upon receiving the read response IRP 70, hostside driver 52(A) checks for zero flag 71b. If it finds that the zero flag 71b is set, then hostside driver 52(A) knows that it can ignore buffer 61 and proceed to issue a zero-fill inter-driver command down the storage stack 51(A) (see below in connection with FIGS. 3-5). Otherwise, hostside driver 52(A) knows that it must send a buffered write inter-driver command down the storage stack 51(A) using buffer 61 (see below in connection with FIGS. 3-5).

FIG. 2 depicts an example environment 30 as in FIG. 1. However, FIG. 2 depicts an alternate arrangement 59' in operation, in which XCOPY 60 is directed at a source LUN that is owned by the peer SP 34(B) even though the XCOPY 60 is sent to SP 34(A).

In order to fulfill XCOPY 60, hostside driver 52(A) prepares and sends buffered read command 62 down the storage stack 51(A). Hostside driver 52(A) also prepares buffer 61 into which the data from the source extent may be stored. Hostside driver 52(A) sets copy flag 63b within buffered read command 62 to indicate that the buffered read command 62 is part of an XCOPY 60.

Since, in the arrangement 59' of FIG. 2, SP 34(A) does not own the source LUN, redirector driver 54(A) intercepts the buffered read command 62 as it proceeds down storage stack 51(A) and redirects it to peer SP 34(B) by sending buffered read command 62' over inter-SP communications bus 48 to peer redirector driver 54(B) within peer storage stack 51(B) on SP 34(B). Upon buffered read command 62' reaching peer redirector driver 54(B), peer redirector driver 54(B) sends buffered read command 62" down peer storage stack 51(B) to peer MCD 58(B). It should be understood that buffered read commands 62, 62', and 62" are substantively identical (although they may contain different routing information), but they are labeled separately to make the redirection clear.

Peer MCD 58(B) processes buffered read command 62" by performing a zero check operation 66 to determine, with reference to a zero bitmap 67, if the source extent is empty (i.e., filled entirely with zeroes). Peer MCD 58(B) also performs a copy check operation 68b to determine whether the copy flag 63b is set within buffered read command 62". This copy check operation 68b is omitted in prior art systems. If copy check operation 68b determines that the copy flag 63b is not set within buffered read command 62", then buffered read command 62" is treated as a simple buffered read command, and peer MCD 58(B) fills (in buffer fill process 69a) buffer 61" stored by peer redirector driver 54(B) with data of the source extent (which is known to be entirely zeroes due to zero check operation 66).

However, if copy check operation 68b determines that the copy flag 63b is set within buffered read command 62", then buffered read command 62" is treated as part of an XCOPY. Since it is known that the source extent is filled entirely with zeroes due to zero check operation 66, peer MCD 58(B) prepares a read response IRP 70 and sets a zero flag 71b therein, omitting buffer fill process 69a.

Regardless of the outcome of copy check operation 68b, peer MCD 58(B) sends the read response IRP 70 back up the peer storage stack 51(B) towards peer redirector driver 54(B). However, only if the copy check operation 68b yields a positive result will read response IRP 70 include the zero flag 71b.

Upon receiving the read response IRP 70, peer redirector driver 54(B) redirects it to SP 34(A) by sending read response IRP 70' over inter-SP communications bus 48 to redirector driver 54(A) within storage stack 51(A) on SP 34(A). Peer redirector driver 54(B) also sends buffer 61" over inter-SP communications bus 48 (in buffer fill process 69a') to redirector driver 54(A) within storage stack 51(A) on SP 34(A), which is stored as buffer 61' by redirector driver 54(A). Upon read response IRP 70' reaching redirector driver 54(A), redirector driver 54(A) sends read response IRP 70" and the contents of buffer 61' (in buffer fill process 69a") up storage stack 51(A) to hostside driver 52(A). It should be understood that read response IRPs 70, 70', and 70" are substantively identical (although they may contain different routing information), but they are labeled separately to make the redirection clear. It should be also be understood that buffers 61, 61', and 62" are substantively identical, but they are labeled separately to make the redirection clear. Buffer 62 is stored by hostside driver 52(A).

Upon receiving the read response IRP 70", hostside driver 52(A) checks for zero flag 71b. If it finds that the zero flag 71b is set, then hostside driver 52(A) knows that it can ignore buffer 61 and proceed to issue a zero-fill inter-driver command down the storage stack 51(A) (see below in connection with FIGS. 3-5). Otherwise, hostside driver 52(A) knows that it must send a buffered write inter-driver command down the storage stack 51(A) using buffer 61 (see below in connection with FIGS. 3-5).

Figure 3:
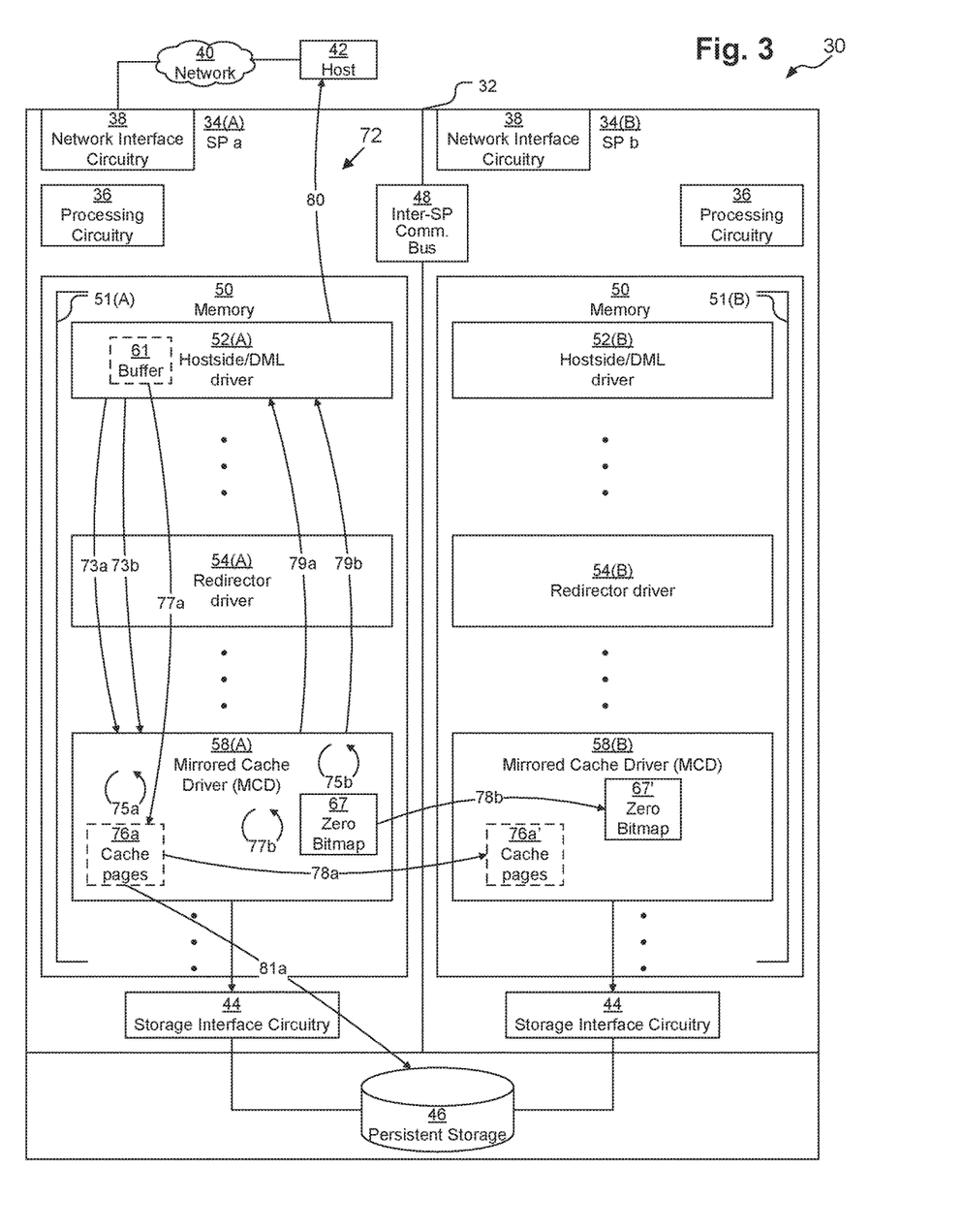
FIG. 3 is a block diagram depicting an example system and apparatus for use in connection with various embodiments as well as example methods of various embodiments.

FIG. 3 depicts an example environment 30 as in FIGS. 1 and 2. However, FIG. 3 depicts an arrangement 72 in operation, in which a second half of XCOPY 60 is fulfilled in a situation in which the XCOPY 60 is directed at a target LUN that is owned by the SP 34(A).

Since XCOPY 60 is a copy operation, hostside driver 52(A) sends either a buffered write command 73a or a zero-fill command 73b down storage stack 51(A), depending on whether or not the source extent was previously determined to be empty of data (in zero check operation 66, see above in connections with FIGS. 1 and 2).

If the source extent is not empty, hostside driver 52(A) prepares and sends buffered write command 73a (e.g., as an inter-driver command taking the form of an IRP) down the storage stack 51(A) to be performed in conjunction with buffer 61 which contains the data from the source extent.

If the source extent is empty, hostside driver 52(A) instead prepares and sends zero-fill command 73b (e.g., as an inter-driver command taking the form of an IRP) down the storage stack 51(A).

Figure 4:
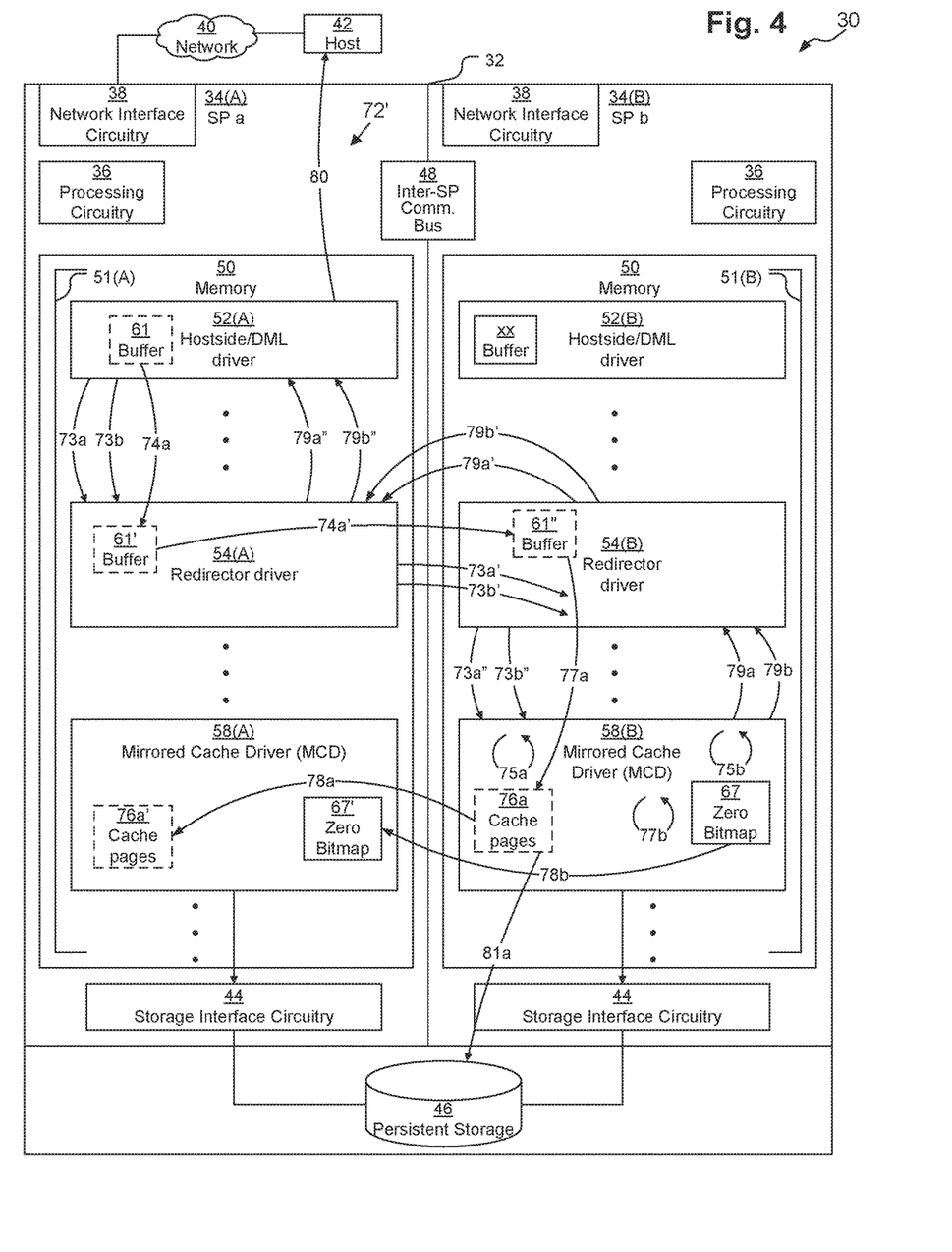
FIG. 4 is a block diagram depicting an example system and apparatus for use in connection with various embodiments as well as example methods of various embodiments.

Arrangement 72 in FIG. 3 is drawn to a particular situation in which the target LUN is owned by the same SP 34(A) that received the XCOPY 60. Alternate arrangement 72' depicted in FIG. 4 is drawn to an alternative situation in which the target LUN is owned by the peer SP 34(B) that did not receive the XCOPY 60.

Since, in the arrangement 72 of FIG. 3, SP 34(A) owns the target LUN, redirector driver 54(A) does not intercept or alter either the buffered write command 73a or zero-fill command 73b as it proceeds down storage stack 51(A).

Upon buffered write command 73a reaching MCD 58(A), MCD 58(A) processes buffered write command 73a by preparing (in cache page preparation process 75a) one or more cache pages 76a of mirrored cache and then copying (in copy process 77a) the contents of buffer 61 into the prepared cache pages 76a. MCD 58(A) then mirrors (in mirroring operation 78a) the cache pages 76a onto peer SP 34(B) over inter-SP communications bus 48, which are stored there as mirrored cache pages 76a'. Upon successfully mirroring the cache pages 76a onto peer SP 34(B), MCD 58(A) sends a write completion IRP 79a back up the storage stack 51(A) towards hostside driver 52(A).

Alternatively, upon zero-fill command 73b reaching MCD 58(A), MCD 58(A) processes zero-fill command 73b by performing a bitmap update process 75b to record that the regions of the target extent are now empty within zero bitmap 67. MCD 58(A) also may perform a deallocation process 77b to remove backing store from the regions of the target extent that are now empty. MCD 58(A) then mirrors (in mirroring operation 78b) the zero bitmap 67 onto peer SP 34(B) over inter-SP communications bus 48, which is stored there as mirrored zero bitmap 67'. Mirroring operation 78b may also include causing peer MCD 58(B) to also remove backing store from the regions of the target extent that are now empty. Upon successfully completing mirroring operation 78b, MCD 58(A) sends a zero-fill completion IRP 79b back up the storage stack 51(A) towards hostside driver 52(A).

Upon receiving either write completion IRP 79a or zero-fill completion IRP 79b, hostside driver 52(A) sends XCOPY completion signal 80 back to host 42.

FIG. 4 depicts an example environment 30 as in FIGS. 1-3. However, FIG. 4 depicts an alternate arrangement 72' in operation, in which a second half of XCOPY 60 is fulfilled in a situation in which the XCOPY 60 is directed at a target LUN that is owned by the peer SP 34(B) even though the XCOPY 60 was sent to SP 34(A).

Since XCOPY 60 is a copy operation, hostside driver 52(A) sends either buffered write command 73a or zero-fill command 73b down storage stack 51(A), as in arrangement 72.

Since, in the alternate arrangement 72' of FIG. 4, SP 34(A) does not own the target LUN, redirector driver 54(A) intercepts either the buffered write command 73a or zero-fill command 73b as it proceeds down storage stack 51(A) and redirects it to peer SP 34(B) by sending either buffered write command 73a' or zero-fill command 73b' over inter-SP communications bus 48 to peer redirector driver 54(B) within peer storage stack 51(B) on SP 34(B). Upon either command 73a', 73b' reaching peer redirector driver 54(B), peer redirector driver 54(B) sends either command 73a", 73b", respectively, down peer storage stack 51(B) to peer MCD 58(B). It should be understood that buffered write commands 73a, 73a', and 73a" are substantively identical (although they may contain different routing information), but they are labeled separately to make the redirection clear. It should also be understood that the zero-fill commands 73b, 73b', and 73b" labeled with the letter "b" are substantively identical (although they may contain different routing information), but they are labeled separately to make the redirection clear. In the event that redirector driver 54(A) sends buffered write command 73a' to peer redirector driver 54(B), redirector driver 54(A) also retrieves buffer 61 (in buffer retrieval process 74a) and stores it locally as buffer 61' and then sends it to peer redirector driver 54(B) (in buffer retrieval process 74a'), where it is stored as buffer 61".

Upon buffered write command 73a" reaching MCD 58(B), MCD 58(B) processes buffered write command 73a" by preparing (in cache page preparation process 75a) one or more cache pages 76a of mirrored cache and then copying (in copy process 77a) the contents of buffer 61" into the prepared cache pages 76a. Peer MCD 58(B) then mirrors (in mirroring operation 78a) the cache pages 76a onto SP 34(A) over inter-SP communications bus 48, which are stored there as mirrored cache pages 76a'. Upon successfully mirroring the cache pages 76a onto SP 34(A), MCD 58(B) is able to send a write completion IRP 79a back up the storage stack 51(B) towards redirector driver 54(B).

Upon receiving the write completion IRP 79a, peer redirector driver 54(B) redirects it to SP 34(A) by sending write completion IRP 79a' over inter-SP communications bus 48 to redirector driver 54(A) within storage stack 51(A) on SP 34(A). Upon write completion IRP 79a' reaching redirector driver 54(A), redirector driver 54(A) sends write completion IRP 79a" up storage stack 51(A) to hostside driver 52(A). It should be understood that write completion IRPs 79a, 79a', and 79a" are substantively identical (although they may contain different routing information), but they are labeled separately to make the redirection clear.

Alternatively, upon zero-fill command 73b reaching peer MCD 58(B), peer MCD 58(B) processes zero-fill command 73b" by performing a bitmap update process 75b to record that the regions of the target extent are now empty within zero bitmap 67. Peer MCD 58(B) also may perform a deallocation process 77b to remove backing store from the regions of the target extent that are now empty. Peer MCD 58(B) then mirrors (in mirroring operation 78b) the zero bitmap 67 onto SP 34(A) over inter-SP communications bus 48, which is stored there as mirrored zero bitmap 67'. Mirroring operation 78b may also include causing MCD 58(A) to also remove backing store from the regions of the target extent that are now empty. Upon successfully completing mirroring operation 78b, peer MCD 58(B) is able to send a zero-fill completion IRP 79b back up the storage stack 51(B) towards redirector driver 54(B).

Upon receiving the zero-fill completion IRP 79b, peer redirector driver 54(B) redirects it to SP 34(A) by sending zero-fill completion IRP 79b' over inter-SP communications bus 48 to redirector driver 54(A) within storage stack 51(A) on SP 34(A). Upon zero-fill completion IRP 79b' reaching redirector driver 54(A), redirector driver 54(A) sends zero-fill completion IRP 79b" up storage stack 51(A) to hostside driver 52(A). It should be understood that zero-fill completion IRPs 79b, 79b', and 79b" are substantively identical (although they may contain different routing information), but they are labeled separately to make the redirection clear.

Upon receiving either write completion IRP 79a" or zero-fill completion IRP 79b", hostside driver 52(A) sends XCOPY completion signal 80 back to host 42.

Figure 5:
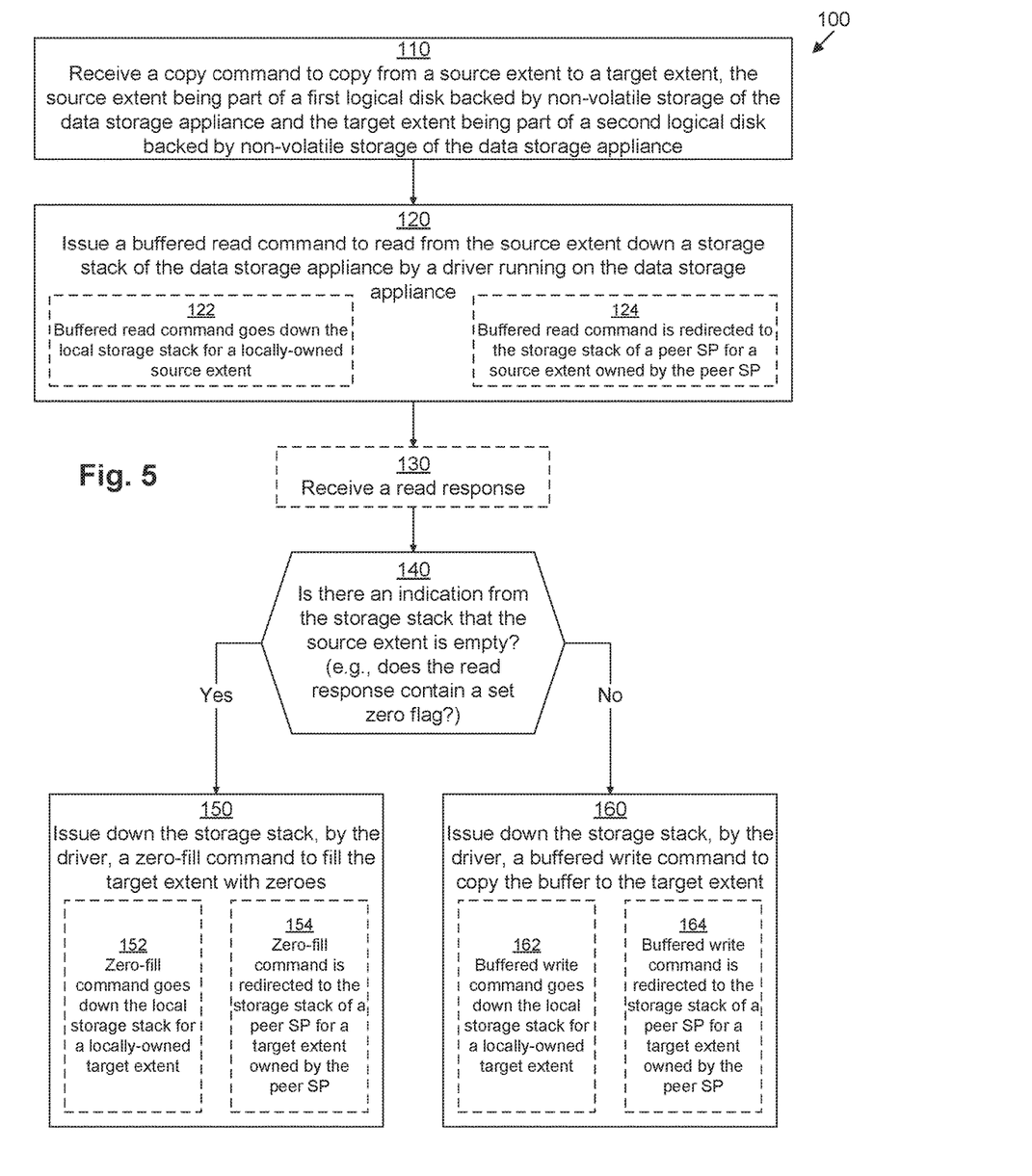
FIG. 5 is a flowchart depicting example methods of various embodiments.

FIG. 5 illustrates an example method 100 performed by storage stack 51(A) (and, in some arrangements also peer storage stack 51(B)) for responding to an XCOPY 60. It should be understood that any time a piece of software (e.g., storage stacks 51, drivers 52, 54, 58, etc.) is described as performing a method, process, step, or function, in actuality what is meant is that a computing device (e.g., DSS 32 or its constituent SPs 34) on which that piece of software is running performs the method, process, step, or function when executing that piece of software on its processing circuitry 36.

It should be understood that, within FIG. 5, step 130 is drawn with a dashed border because it may be considered optional or ancillary, depending on the embodiment. In addition, sub-steps 122, 124, 152, 154, 162, and 164 are drawn with dashed borders because they represent various alternate scenarios in which method 100 may be employed. In addition, one or more of the other steps or sub-steps of method 100 may be omitted in some embodiments. Similarly, in some embodiments, one or more steps or sub-steps may be combined together or performed in a different order. Method 100 is performed by DSS 32.

In step 110, hostside driver 52(A) running within storage stack 51(A) on a first SP 34(A) receives a copy command (e.g., XCOPY 60) to copy from a source extent to a target extent, the source extent being part of a first logical disk backed by non-volatile storage 46 of DSS 32 and the target extent being part of a second logical disk backed by non-volatile storage 46 of the DSS 32.

In response, in step 120, hostside driver 52(A) issues a buffered read command 62 down storage stack 51(A) to read from the source extent. In some embodiments, hostside driver 52(A) sets copy flag 63b within buffered read command 62 to indicate that it is in fulfillment of XCOPY 60. In sub-step 122, in which the source extent is locally-owned by SP 34(A), the buffered read command 62 proceeds all the way down local storage stack 51(A) to be fulfilled by MCD 58(A). Alternatively, in sub-step 124, in which the source extent is not locally-owned by SP 34(A) but is instead owned by peer SP 34(B), the buffered read command 62 is redirected to peer storage stack 51(B) on peer SP 34(B) to be fulfilled by peer MCD 58(B).

In response to step 120, either MCD 58(A) or peer MCD 58(B) processes buffered read command 62 as described above in connection with FIG. 1 or FIG. 2, respectively.

In ancillary step 130, hostside driver 52(A) receives read response IRP 70, although in other embodiments, hostside driver 52(A) may instead receive some other signal indicating completion of the buffered read command 62.

In step 140, hostside driver 52(A) determines whether there has been any indication received from storage stack 51(A) that the source extent is empty. For example, hostside driver 52(A) determines whether read response IRP 70 includes the zero flag 71b set therein.

If step 140 yields an affirmative result, in step 150, hostside driver 52(A) issues a zero-fill command 73b down storage stack 51(A) to fill the target extent with zeroes. In sub-step 152, in which the target extent is locally-owned by SP 34(A), the zero-fill command 73b proceeds all the way down local storage stack 51(A) to be fulfilled by MCD 58(A). Alternatively, in sub-step 154, in which the target extent is not locally-owned by SP 34(A) but is instead owned by peer SP 34(B), the zero-fill command 73b is redirected to peer storage stack 51(B) on peer SP 34(B) to be fulfilled by peer MCD 58(B). In response to step 150, either MCD 58(A) or peer MCD 58(B) processes zero-fill command 73b as described above in connection with FIG. 3 or FIG. 4, respectively.

If step 140 yields a negative result, then, in step 160, hostside driver 52(A) issues a buffered write command 73a down storage stack 51(A) to copy the contents of the buffer 61 to the target extent. In sub-step 162, in which the target extent is locally-owned by SP 34(A), the buffered write command 73a proceeds all the way down local storage stack 51(A) to be fulfilled by MCD 58(A). Alternatively, in sub-step 164, in which the target extent is not locally-owned by SP 34(A) but is instead owned by peer SP 34(B), the z buffered write command 73a is redirected to peer storage stack 51(B) on peer SP 34(B) to be fulfilled by peer MCD 58(B). In response to step 160, either MCD 58(A) or peer MCD 58(B) processes buffered write command 73a as described above in connection with FIG. 3 or FIG. 4, respectively.

Thus, techniques have been presented which detect when an XCOPY 60 or other offloaded copy command has a source that is entirely empty of data (all zeroes) and then utilize a zero-fill operation 73b to easily fill the destination with zeroes without transferring empty buffers 61" across Inter-SP communications bus 48. Thus, unlike in prior art approaches, if the source extent is empty, then:

(I) MCD 58 need not waste time copying zeroes into the entirety of buffer 61;

(II) buffer 61" need not be sent across Inter-SP communications bus 48 in buffer fill process 69a' of alternate arrangement 59';

(III) cache pages 76a need not be mirrored across Inter-SP communications bus 48 in mirroring process 78a of arrangements 72 and 72'; and (IV) buffer 61" need not be sent across Inter-SP communications bus 48 in buffer retrieval process 74a' of alternate arrangement 72'.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of accelerating copy operations performed by a data storage appliance, the method comprising:
    in response to receiving a copy command to copy from a source extent to a target extent, issuing a buffered read command to read from the source extent down a storage stack of the data storage appliance by a driver running on the data storage appliance, the source extent being part of a first logical disk backed by non-volatile storage of the data storage appliance and the target extent being part of a second logical disk backed by non-volatile storage of the data storage appliance;
    in response to issuing the buffered read command, receiving at the driver an indication from the storage stack that the source extent is empty; and
    in response to receiving the indication that the source extent is empty, issuing a zero-fill command to fill the target extent with zeroes down the storage stack by the driver
wherein:
    the driver and the storage stack both run on a first storage processor (SP) of the data storage appliance;
    a second SP of the data storage appliance is configured to be primarily responsible for the first logical disk, while the first SP is configured to serve as a cache mirror for the first logical disk and to forward storage commands that are directed to the first logical disk to the second SP over an inter-SP communications bus (ISCB); and
    the method further comprises, in response to the driver issuing the buffered read command down the storage stack:
        a redirector driver of the storage stack redirecting the buffered read command across the ISCB to another driver stack running on the second SP;
        receiving, by the redirector driver, a read response from the other driver stack over the ISCB, the read response including a set zero-filled flag, wherein the second SP does not send a buffer to the first SP over the ISCB in connection with the read response; and
        forwarding the received read response up the driver stack by the redirector driver including the set zero-filled flag, the set zero-filled flag serving as the indication that the source extent is empty.

2. The method of claim 1 wherein issuing the buffered read command includes the driver setting a copy flag within the buffered read command indicating that the buffered read command has been issued as part of a copy operation.

3. A method of accelerating copy operations performed by a data storage appliance, the method comprising:
    in response to receiving a copy command to copy from a source extent to a target extent, issuing a buffered read command to read from the source extent down a storage stack of the data storage appliance by a driver running on the data storage appliance, the source extent being part of a first logical disk backed by non-volatile storage of the data storage appliance and the target extent being part of a second logical disk backed by non-volatile storage of the data storage appliance, wherein issuing the buffered read command includes the driver setting a copy flag within the buffered read command indicating that the buffered read command has been issued as part of a copy operation;
    in response to issuing the buffered read command, receiving at the driver an indication from the storage stack that the source extent is empty;
    in response to receiving the indication that the source extent is empty, issuing a zero-fill command to fill the target extent with zeroes down the storage stack by the driver; and
    in response to the driver issuing the buffered read command down the storage stack:
        detecting by a lower-layer driver of the storage stack that both (a) the copy flag has been set within the buffered read command and (b) a zero bit within a zero bitmap is set for each region of the target extent indicating that each region is empty; and
        in response to detecting both (a) and (b), sending a read response up the driver stack by the lower-layer driver including a set zero-filled flag, the set zero-filled flag serving as the indication that the source extent is empty;

wherein the lower-layer driver refrains from reading data from the source extent in response to receiving the buffered read command.

4. The method of claim 3 wherein:
the zero bitmap includes a zero bit corresponding to each one-megabyte megabyte-aligned region of the first logical disk; and
the source extent is megabyte-aligned.

5. A method of accelerating copy operations performed by a data storage appliance, the method comprising:
in response to receiving a copy command to copy from a source extent to a target extent, issuing a buffered read command to read from the source extent down a storage stack of the data storage appliance by a driver running on the data storage appliance, the source extent being part of a first logical disk backed by non-volatile storage of the data storage appliance and the target extent being part of a second logical disk backed by non-volatile storage of the data storage appliance;
in response to issuing the buffered read command, receiving at the driver an indication from the storage stack that the source extent is empty; and
in response to receiving the indication that the source extent is empty, issuing a zero-fill command to fill the target extent with zeroes down the storage stack by the drive;
wherein:
the driver and the storage stack both run on a first storage processor (SP) of the data storage appliance;
a second SP of the data storage appliance is configured to be primarily responsible for the second logical disk, while the first SP is configured to serve as a cache mirror for the second logical disk and to forward storage commands that are directed to the second logical disk to the second SP over an inter-SP communications bus (ISCB); and
the method further comprises, in response to the driver issuing the zero-fill command to fill the target extent with zeroes down the storage stack, a redirector driver of the storage stack redirecting the zero-fill command across the ISCB to another driver stack running on the second SP, wherein the first SP does not send a buffer to the second SP over the ISCB in connection with the zero-fill command.

6. A data storage appliance comprising:
non-volatile storage backing a first logical disk and a second logical disk;
a first storage processor (SP) and a second SP, each of the first SP and the second SP including processing circuitry coupled to memory;
an inter-SP communications bus (ISCB) configured to allow the first SP to communicate with the second SP; and
a driver and a storage stack both running on the processing circuitry coupled to memory of the first SP;
wherein the second SP is configured to be primarily responsible for the first logical disk, while the first SP is configured to serve as a cache mirror for the first logical disk and to forward storage commands that are directed to the first logical disk to the second SP over the ISCB; and
the processing circuitry coupled to memory of the first SP is configured to accelerate copy operations by:
in response to receiving a copy command to copy from a source extent to a target extent, issuing a buffered read command to read from the source extent down the storage stack by the driver, the source extent being part of the first logical disk and the target extent being part of the second logical disk;
in response to issuing the buffered read command, receiving at the driver an indication from the storage stack that the source extent is empty;
in response to receiving the indication that the source extent is empty, issuing a zero-fill command to fill the target extent with zeroes down the storage stack by the driver;
a redirector driver of the storage stack redirecting the buffered read command across the ISCB to another driver stack running on the second SP;
receiving, by the redirector driver, a read response from the other driver stack over the ISCB, the read response including a set zero-filled flag, wherein the second SP does not send a buffer to the first SP over the ISCB in connection with the read response; and
forwarding the received read response up the driver stack by the redirector driver including the set zero-filled flag, the set zero-filled flag serving as the indication that the source extent is empty.

7. The data storage appliance of claim 6 wherein issuing the buffered read command includes the driver setting a copy flag within the buffered read command indicating that the buffered read command has been issued as part of a copy operation.

8. The data storage appliance of claim 7 wherein the processing circuitry coupled to memory is further configured to, in response to the driver issuing the buffered read command down the storage stack:
detecting by a lower-layer driver of the storage stack that both (a) the copy flag has been set within the buffered read command and (b) a zero bit within a zero bitmap is set for each region of the target extent indicating that each region is empty; and
in response to detecting both (a) and (b), sending a read response up the driver stack by the lower-layer driver including a set zero-filled flag, the set zero-filled flag serving as the indication that the source extent is empty;
wherein the lower-layer driver refrains from reading data from the source extent in response to receiving the buffered read command.

9. The data storage appliance of claim 8 wherein:
the zero bitmap includes a zero bit corresponding to each one-megabyte megabyte-aligned region of the first logical disk; and
the source extent is megabyte-aligned.

10. A data storage appliance comprising:
non-volatile storage backing a first logical disk and a second logical disk;
a first storage processor (SP) and a second SP, each of the first SP and the second SP including processing circuitry coupled to memory;
an inter-SP communications bus (ISCB) configured to allow the first SP to communicate with the second SP; and
a driver and a storage stack both running on the processing circuitry coupled to memory of the first SP;
wherein the second SP of the data storage appliance is configured to be primarily responsible for the second logical disk, while the first SP is configured to serve as a cache mirror for the second logical disk and to forward storage commands that are directed to the second logical disk to the second SP over the ISCB; and
the processing circuitry coupled to memory of the first SP is configured to accelerate the copy operations by in response to receiving a copy command to copy from a source extent to a target extent, issuing a buffered read command to read from the source extent down the storage stack by the driver, the source extent being part of the first logical disk and the target extent being part of the second logical disk;

in response to issuing the buffered read command, receiving at the driver an indication from the storage stack that the source extent is empty;

in response to receiving the indication that the source extent is empty, issuing a zero-fill command to fill the target extent with zeroes down the storage stack by the driver; and in response to the driver issuing the zero-fill command to fill the target extent with zeroes down the storage stack, a redirector driver of the storage stack redirecting the zero-fill command across the ISCB to another driver stack running on the processing circuitry coupled to memory of the second SP, wherein the first SP does not send a buffer to the second SP over the ISCB in connection with the zero-fill command.

11. The data storage appliance of claim 10 wherein issuing the buffered read command includes the driver setting a copy flag within the buffered read command indicating that the buffered read command has been issued as part of a copy operation.

12. The data storage appliance of claim 11 wherein the processing circuitry coupled to memory of the first SP is further configured to, in response to the driver issuing the buffered read command down the storage stack:

detect by a lower-layer driver of the storage stack that both (a) the copy flag has been set within the buffered read command and (b) a zero bit within a zero bitmap is set for each region of the target extent indicating that each region is empty; and in response to detecting both (a) and (b), send a read response up the driver stack by the lower-layer driver including a set zero-filled flag, the set zero-filled flag serving as the indication that the source extent is empty;

wherein the lower-layer driver refrains from reading data from the source extent in response to receiving the buffered read command.

13. The data storage appliance of claim 12 wherein:
the zero bitmap includes a zero bit corresponding to each one-megabyte megabyte-aligned region of the first logical disk; and
the source extent is megabyte-aligned.

14. A computer program product comprising a non-transitory computer-readable storage medium storing a set of instructions, which, when executed by processing circuitry of a data storage appliance, causes the data storage appliance to accelerate copy operations by:

in response to receiving a copy command to copy from a source extent to a target extent, issuing a buffered read command to read from the source extent down a storage stack of the data storage appliance by a driver running on the data storage appliance, the source extent being part of a first logical disk backed by non-volatile storage of the data storage appliance and the target extent being part of a second logical disk backed by non-volatile storage of the data storage appliance, wherein issuing the buffered read command includes the driver setting a copy flag within the buffered read command indicating that the buffered read command has been issued as part of a copy operation;

in response to issuing the buffered read command, receiving at the driver an indication from the storage stack that the source extent is empty; and in response to receiving the indication that the source extent is empty, issuing a zero-fill command to fill the target extent with zeroes down the storage stack by the driver, and, in response:

detecting by a lower-layer driver of the storage stack that both (a) the copy flag has been set within the buffered read command and (b) a zero bit within a zero bitmap is set for each region of the target extent indicating that each region is empty; and in response to detecting both (a) and (b), sending a read response up the driver stack by the lower-layer driver including a set zero-filled flag, the set zero-filled flag serving as the indication that the source extent is empty;

wherein the lower-layer driver refrains from reading data from the source extent in response to receiving the buffered read command.

15. The computer program product of claim 14 wherein:
the zero bitmap includes a zero bit corresponding to each one-megabyte megabyte-aligned region of the first logical disk; and
the source extent is megabyte-aligned.

16. The computer program product of claim 14 wherein:
the driver and the storage stack both run on a first storage processor (SP) of the data storage appliance;
a second SP of the data storage appliance is configured to be primarily responsible for the first logical disk, while the first SP is configured to serve as a cache mirror for the first logical disk and to forward storage commands that are directed to the first logical disk to the second SP over an inter-SP communications bus (ISCB); and
the instructions, when executed by the processing circuitry, further cause the data storage appliance to accelerate copy operations by, in response to the driver issuing the buffered read command down the storage stack:

a redirector driver of the storage stack redirecting the buffered read command across the ISCB to another driver stack running on the second SP;

receiving, by the redirector driver, a read response from the other driver stack over the ISCB, the read response including a set zero-filled flag, wherein the second SP does not send a buffer to the first SP over the ISCB in connection with the read response; and forwarding the received read response up the driver stack by the redirector driver including the set zero-filled flag, the set zero-filled flag serving as the indication that the source extent is empty.

17. The computer program product of claim 14 wherein:
the driver and the storage stack both run on a first storage processor (SP) of the data storage appliance;
a second SP of the data storage appliance is configured to be primarily responsible for the second logical disk, while the first SP is configured to serve as a cache mirror for the second logical disk and to forward storage commands that are directed to the second logical disk to the second SP over an inter-SP communications bus (ISCB); and
the instructions, when executed by the processing circuitry, further cause the data storage appliance to accelerate copy operations by, in response to the driver issuing the zero-fill command to fill the target extent with zeroes down the storage stack, a redirector driver of the storage stack redirecting the zero-fill command across the ISCB to another driver stack running on the second SP, wherein the first SP does not send a buffer to the second SP over the ISCB in connection with the zero-fill command.

\* \* \* \* \*